INVENTOR.

Patented June 29, 1954

2,682,294

UNITED STATES PATENT OFFICE 2,682,294

HEAT SEALING MACHINE OF THE THERMAL IMPULSE TYPE AND SEALING BAR THEREFOR

Nicholas Langer, New York, N. Y.

Application October 21, 1952, Serial No. 315,993

7 Claims. (Cl. 154—42)

1

This invention relates to the art of heat sealing thermoplastic materials, and, more particularly, to a novel and improved sealing device or bar for heat sealing machines of the thermal impulse type.

The present application is a continuation-in-part of my co-pending application Serial No. 71,421, filed January 18, 1949, now Patent No. 2,630,396, granted March 3, 1953.

As disclosed in my Patent 2,460,460, heat sealing machines of the thermal impulse type essentially comprise a pair of pressure members or bars and a reciprocating mechanism therefor whereby pressure may be applied upon two or more layers of thermoplastic film to be heat sealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinyledene chloride). A heater element in the form of a thin and narrow strip of a metal of high specific resistance, such as a suitable nickel-chromium alloy known in the trade as Nichrome, is mounted on the face of at least one of said bars, constituting the operating or sealing surface of the machine. Sealing pulses of electric current may be passed through the said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element, which, as a result of its low capacity, is heated to heat sealing temperature in a small fraction of a second. The heat thus produced is immediately transferred by surface contact to the region of the thermoplastic layers compressed between the bars, causing heat sealing thereof. A short period thereafter, the heat produced by the pulse of current is dissipated and the seal is cooled and consolidated under pressure whereby a strong and sound seal is obtained.

Heat sealing machines of the thermal impulse type provide important advantages over the commonly used heat sealing machines in which the sealing member is continuously maintained at a constant sealing temperature. Due to the fact that the thermal impulse principle permits the sealed region to cool and to consolidate under pressure, the quality of the seal is greatly improved. Also the thermal impulse principle makes it possible to readily seal films of materials, which cannot be sealed on an industrial scale with sealing members continuously maintained at constant sealing temperatures, such as particularly Polythene and Saran.

Although heat sealing machines of the thermal impulse type provided excellent results and achieved remarkable commercial success within a short period after their introduction, certain practical difficulties were experienced when it was desired to seal articles in which the thickness of the layers to be sealed was subject to considerable variations. Such was the case, for example, when sealing gusseted bags formed from strips of thermoplastic sheet material with a longitudinal lap seam where the number of layers to be sealed together in a transversely extending zone can be 2, 3, or 4. As prior sealing bars of the thermal impulse type have been generally rigid in character, excessive pressure was applied to the regions where the number of layers to be sealed together was 4, while insufficient pressure was applied to the regions where the number of layers was only 2. While this difficulty was to some extent reduced by forming the pressure face of the second, unheated bar of an elastic material it was not completely eliminated by such elastic or yielding character of the pressure bar. The same conditions prevailed when constructing and operating heat sealing machines of the thermal impulse type wherein the length of the bars was accentuated, for example, in excess of 2 feet. In machines of this type even a minor misalignment of the bars, departing from their exact parallelism, would be the cause of considerable difference between the sealing pressures exerted by the respective ends of the bars. As sealing lengths of 42 inches, or more, are quite common today for example in producing barrel liners from thermoplastic films, it was necessary to construct the bars and their reciprocating mechanism with great rigidity and mechanical precision at substantial additional expense.

I have now discovered that the outstanding problem may be solved in a remarkably simple manner.

It is an object of the present invention to improve heat sealing machines of the thermal impulse type.

It is another object of the present invention to provide an improved machine for heat sealing thermoplastic sheet materials which is particularly suitable for sealing articles, such as gusseted bags, wherein the thickness or the number of layers to be sealed in a single operation may be subject to considerable variations.

It is a further object of the present invention to provide a novel and improved sealing bar suitable for heat sealing machines of the thermal impulse type which, in contrast to the prior substantially rigid sealing bars, is characterized by a yielding and elastic sealing face, capable of conforming to the surface contour of the layers to be heat sealed.

Other and further objects and advantages of the present invention will become apparent from the following description taken in conjunction with the accompanying drawing, in which Fig. 1 is a side elevational view, somewhat fragmentary in character and having parts in section, of a heat sealing machine embodying the invention;

Broadly stated in accordance with the principles of my invention, I provide a sealing bar comprising a rigid base having a relatively thick layer of elastic, heat-resistant insulating material thereon. Upon this elastic layer, there is tensioned a heater element in the form of a thin, flexible band of a metal of high specific resistance, the width of which is preferably less than that of the elastic layer. In some cases it is desirable to cover the heater element and also the exposed portions of the underlying elastic layer with an additional layer of flexible, heat-resistant insulating material having such surface characteristics that the heat sealed or fused thermoplastic material will not adhere or stick thereto. This layer of flexible insulating material must be sufficiently thin to assure the rapid transmission of sealing heat therethrough.

I have found that a sealing bar of the described type is characterized by a sealing face which is elastic and yielding so that it can readily adapt itself to the surface contour of the material to be sealed. It may be employed in combination with a pressure bar having an elastic pressure face or a rigid and metallic pressure face. In the latter case, it is preferred to form a channel in the pressure bar for the passage of a coolant fluid therethrough whereby any residual heat may be rapidly and conveniently removed from the sealed region of the thermoplastic layers.

Figure 1:
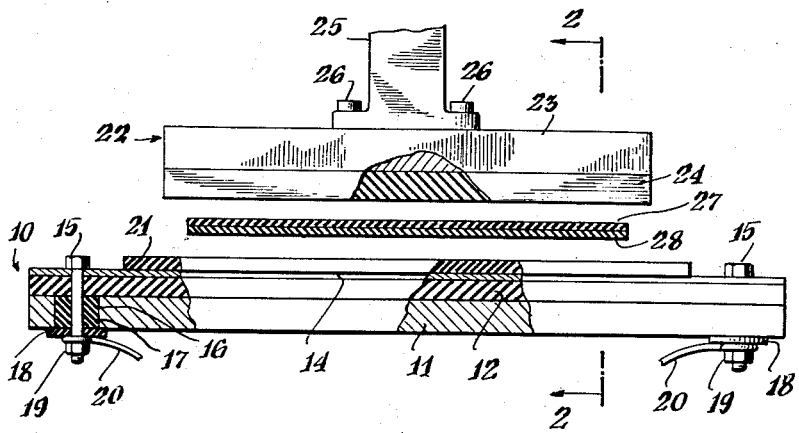
Figure 2:
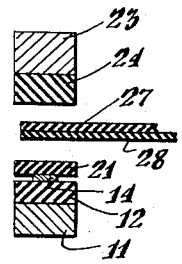
Fig. 2 is a section taken on line 2—2 of Fig. 1.

Referring now to Figs. 1 and 2 of the drawing, reference numeral 10 generally denotes the sealing bar of the invention comprising a rigid base in the form of a metal bar 11 having a relatively thick layer of an elastic and heat-resistant insulating material 12 mounted thereon. This material is of such character that it is not adversely affected by heat sealing temperatures, a suitable grade of silicone rubber being excellently suited for the purpose. Upon the top face of elastic layer 12, there is tensioned a heater element 14 in the form of a narrow and flexible band of a metal having a high specific resistance, such as Nichrome (a nickel base alloy containing 11–22% chromium and smaller amounts of silicon and manganese), Inconel (a nickel base heat- and oxidation-resistant alloy with approximately 13% chromium, 6% iron and small amounts of manganese, silicon and copper, and Nilvar (a high-nickel-iron alloy with about 36% of nickel showing extremely low coefficient of temperature expansion). As it will be observed in Fig. 2, heater element 14 is considerably less in width than the underlying elastic layer 12.

The heater element 14 has a bolt 15 extending through each of its ends, the said bolt also extending through suitable openings provided in the elastic layer 12 and openings 16 in metal base 11. A bushing 17 and a washer 18 of insulating material serve to prevent electrical contact between bolts 15 and metal base 11. Bolts 15 have nuts 19 secured thereto whereby the entire structure is being held together, including the ends of lead wires 20, which serve for connecting the heater element 14, into circuit with a suitable source of electrical energy. (Not shown.) A thin layer 21 of flexible, heat-resistant insulating material is cemented or otherwise secured to the top face of the sealing bar. Suitable materials for this purpose are Teflon (polymerized tetrafluoro-ethylene) or Kel-F (polymerized trifluorochloroethylene) either in the form of solid layers or as an impregnant for a glass fiber fabric. The provision of such layer, while not absolutely necessary, is advantageous in that it protects the thin and flexible heater element 14 against abrasion and injury and in addition, as a result of the surface characteristic of Teflon and Kel-F, prevents sticking of the sealing face to the heat sealed regions.

Sealing bar 10 is mounted for cooperation with a pressure bar generally denoted by reference numeral 22, comprising a metal base 23 and an underlying elastic layer 24 which may advantageously be formed of silicone rubber. Pressure bar 22 is secured to a reciprocable support 25 by means of bolts 26.

From the foregoing description, it will be readily appreciated that when thermoplastic layers 27 and 28 to be heat sealed are introduced between bars 10 and 22 and the said bars are compressed by means of a suitable reciprocating mechanism (not shown), yielding and elastic pressure will be applied to both faces of the thermoplastic layers. This is due to the fact that both sealing member 10, as well as pressure member 22 are characterized by pressure-exerting surfaces of elastic or compressible character assured by the provision of elastic layers 12 and 24, respectively. While the elastic layer 12 is not in direct contact with the materials or layers to be sealed, its elasticity is effective to a sufficient extent through the heater element 14 mounted thereon as a result of the relatively flexible character of the said element. As it has been set forth in the foregoing, such slightly elastic and conformable character of the operative surfaces of both pressure members or bars is quite beneficial when heat sealing articles the thickness of which is not uniform throughout the sealing zone, such being the case, for example, with gusseted bags.

Figure 3:
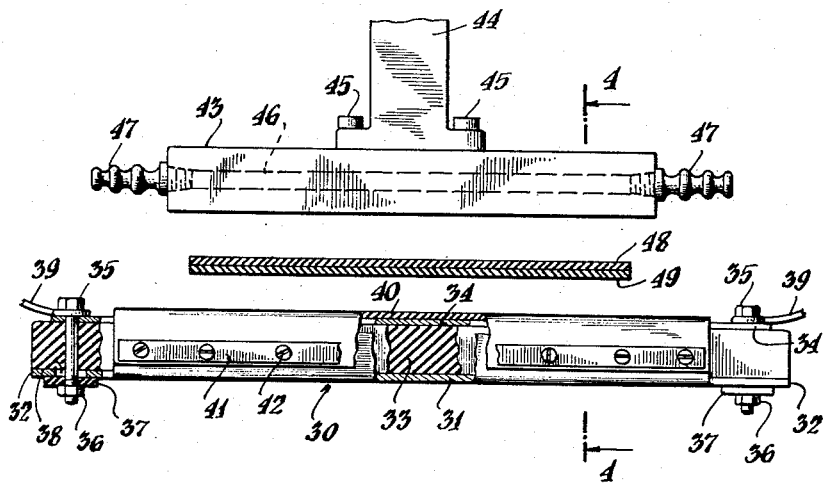
Fig. 3 is a view similar to Fig. 1 of a modified embodiment of the invention.
Figure 4:
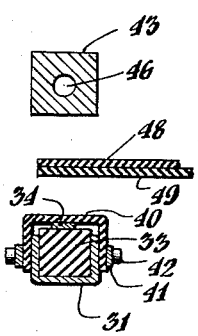
Fig. 4 is a section taken on line 4—4 of Fig. 3.

Considering now the modified embodiment of the invention shown in Figs. 3 and 4, reference numeral 30 generally denotes the heat sealing member or bar which comprises a rigid metal member or base 31 having a channel or U-shaped cross section. At each end of said channel-shaped member, the side walls of the member are cut away, leaving only the horizontal or bottom portion thereof, as indicated at 32. In the channel member 31 is confined an elongated piece 33 of elastic insulating material, such as silicone rubber which is substantially rectangular in cross section and is of such thickness as to extend somewhat above the side walls of the channel member. Upon the top surface of elastic layer or piece 33 is tensioned heater element 34 in the form of a thin, narrow and flexible metal band formed of metal of high specific resistance, same as heater element 14 in the previously described embodiment of the invention. This is accomplished by means of bolts 35 extending through aligned openings in heater element 34, elastic layer 33 and extensions 32 of channel member 31. Bolts 35 are secured by means of nuts 36, it being noted that the bolts are electrically insulated from extensions 32 of the channel member by means of insulating washers 37 and due to the fact that apertures 38 in the said extensions are considerably larger in diameter than the diameter of bolts 35. Lead wires 39 have their ends interposed between the heads of bolts 35 and the terminal portions of heater element 34 whereby the heater element may be connected in circuit with a source of electrical impulses as this is set forth more fully in my above-mentioned Patent No. 2,460,460.

A thin layer or strip 40 of flexible, heat-resistant insulating material (Teflon or Kel-F) is placed over heater element 34 and has its longitudinal marginal portions bent down over the upwardly extending side portions of channel member 31, as this will be best observed in Fig. 4. These bent down portions of strip 40 are secured by means of a narrow metal strip or plate 41 at each side which is pressed against the side portions of channel member 31 by means of screws 42 extending through apertures in metal plates 41 and insulating layer 40 into threaded holes in the side portions of the channel member.

The sealing bar 30 just described may be used in combination with a pressure bar having an elastic pressure face, such as is shown at 22 in Fig. 1. In the instant case, however, it is shown as being arranged for cooperation with a rigid bar 43 of metal of high heat conductivity, such as copper, brass, or aluminum mounted for reciprocation on a support 44 by means of bolts 45. This metal bar is provided with a longitudinally extending channel 46 through which a flow of coolant fluid, such as water, may be passed for the efficient withdrawal of heat therefrom. Nipples 47 are attached to the ends of channel 46 whereby a flexible hose may be readily connected to each end of the channel for the introduction and discharge of coolant fluid.

In view of the similarity of construction the operation of this modified embodiment of the invention will be readily understood by those skilled in the art without any detailed description. It will be sufficient to state that when layers 48 and 49 of thermoplastic material are interposed between sealing bar 30 and pressure bar 43, the reciprocating means (not shown) are actuated and a pulse of current is passed through heater element 34, a seal is formed in accordance with the well-known principles of thermal impulse sealing which are fully explained, for example, in my above-mentioned Patent No. 2,460,460. The elastically yielding surface characteristics of sealing bar 30 will compensate for any non-uniformity in the thickness of the layers to be heat sealed while the high heat conductivity of the face of pressure member 43 will readily remove any residual heat from the sealed region of the layers after each sealing operation, such withdrawal of heat being further promoted, if desired, by the passage of coolant fluid through such member.

It will be noted that the present invention provides a number of important advantages which may be summarized as follows:

1. The sealing pressure is maintained uniform even though the thickness of the layers to be heat sealed or the number of such layers in the sealing zone may be subject to considerable variations. It has been shown by actual experiments with heat sealing machines of the thermal impulse type embodying the present invention that in articles in which the number of layers in the sealing zone varies from 2 layers to 10 layers, satisfactory seals have been obtained in a single sealing operation without oversealing or scorching the region where only 2 layers were present or undersealing or producing an imperfect seal where as many as 10 layers were present.

2. Minor misalignments in the parallelism of the sealing and pressure bars do not have any adverse effect on the operation of the machine. This is of considerable importance in heat sealing machines of the thermal impulse type having bars of accentuated length, such as 42 inches, or more, which are now in commercial production.

3. The combination of heat sealing bars of the thermal impulse type with rigid metal bars of high heat conductivity, which may be water-cooled, if desired, any residual heat may be rapidly withdrawn from the sealing zone. This permits a substantial increase in the sealing speed which is an important factor when the thermal impulse principle is applied to high-speed, automatic packaging machinery.

Although the present invention has been disclosed in connection with a few preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. A sealing bar for heat sealing machines comprising, in combination, a substantially rigid backing member, a layer of elastic insulating material thereon, and an elongated directly heated flexible metal member mounted on said layer and constituting a heater element adapted to yieldingly conform to the surface of the materials to be heat sealed.

2. A sealing bar for heat sealing machines of the thermal impulse type comprising, in combination, a substantially rigid backing member, a layer of heat-resistant elastic insulating material thereon, a flexible metal strip tensioned on said layer, said strip being adapted to be heated to heat sealing temperatures by the passage of electric current therethrough and to conform to the surface contour of the layers to be heat sealed as a result of its flexibility and of the elasticity of the underlying layer, and a layer of heat-resistant flexible insulating material overlying said metal strip and being sufficiently thin to assure the rapid transmission of sealing heat therethrough.

3. A sealing bar for heat sealing machines of the thermal impulse type comprising, in combination, a substantially rigid backing member, a layer of heat-resistant elastic insulating material thereon, a flexible metal strip tensioned on said layer, said strip being less in width than said layer and being adapted to be heated to heat sealing temperatures by the passage of electric current therethrough and to conform to the surface contour of the layers to be heat sealed, and a layer of heat-resistant flexible insulating material overlying said metal strip and said elastic layer and said backing member and being sufficiently thin to assure the rapid transmission of sealing heat therethrough, said last-named layer constituting the sealing face of the bar.

4. A sealing bar for heat sealing machines of the thermal impulse type comprising, in combination, a rigid, channel-shaped metal backing member, an elongated body of elastic insulating material in the channel portion of said member, a flexible metal strip tensioned on said elastic body, said strip being less in width than said body and being adapted to be heated to heat sealing temperature by the passage of electric current therethrough and to conform to the surface contour of the layers to be heat sealed, and a layer of heat-resistant flexible insulating material overlying said metal strip and said elastic body and being sufficiently thin to assure the rapid transmission of sealing heat therethrough, said layer constituting the operative and sealing face of the bar.

5. In a machine for heat sealing thermoplastic layers, the combination which comprises a sealing bar including a rigid backing member, a layer of elastic material thereon, and a flexible metal strip mounted on said layer and constituting therewith an electric heater element conformable to the surface contour of the layers to be heat sealed; and a rigid pressure bar of high heat conductivity metal mounted for cooperation with said sealing bar and adapted to withdraw heat from the thermoplastic layers interposed between said bars after the sealing operation.

6. The machine claimed in claim 5 wherein the width of the flexible metal strip is less than that of the underlying elastic layer and that of the rigid pressure bar and wherein a channel is provided in the rigid pressure bar for the passage of coolant fluid therethrough.

7. In a machine for heat sealing thermoplastic layers, the combination which comprises a sealing bar including a rigid backing member, a layer of heat-resistant elastic insulating material thereon, a flexible metal strip tensioned on said layer, and a thin layer of heat-resistant flexible insulating material overlying said elastic layer and said metal strip and constituting a yieldingly conformable sealing face for the bar; and a rigid pressure bar of high heat conductivity metal mounted for cooperation with said sealing bar and adapted to withdraw heat from the thermoplastic layers interposed between said bars after the sealing operation.

References Cited in the file of this patent

UNITED STATES PATENTS

| Number | Name | Date |
| --- | --- | --- |
| 2,289,618 | Young | July 14, 1942 |
| 2,574,094 | Fener et al. | Nov. 6, 1951 |
| 2,574,095 | Langer | Nov. 6, 1951 |
| 2,614,953 | Anglada | Oct. 21, 1952 |